(12) United States Patent
Lo

(10) Patent No.: US 11,879,633 B1
(45) Date of Patent: Jan. 23, 2024

(54) DISPLAY DEVICE AND ITS BACK LIGHT MODULE AND SUPPORT COLUMN

(71) Applicant: AmTRAN Technology Co., Ltd., New Taipei (TW)

(72) Inventor: Kai-Di Lo, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 0 days.

(21) Appl. No.: 18/191,889

(22) Filed: Mar. 29, 2023

(30) Foreign Application Priority Data

Feb. 10, 2023 (TW) .................................. 112104878

(51) Int. Cl.
*F21V 7/05* (2006.01)
*F21Y 105/12* (2016.01)
*F21Y 115/10* (2016.01)

(52) U.S. Cl.
CPC ............. *F21V 7/05* (2013.01); *F21Y 2105/12* (2016.08); *F21Y 2115/10* (2016.08)

(58) Field of Classification Search
CPC ......... G02F 1/133608; G02F 1/133606; G02F 1/133308
See application file for complete search history.

(56) References Cited

U.S. PATENT DOCUMENTS

| | | | | |
|---|---|---|---|---|
| 7,760,291 | B2* | 7/2010 | Morita | G02F 1/133611 362/97.3 |
| 9,557,602 | B2* | 1/2017 | Suzuki | G02F 1/133611 |
| 10,353,241 | B2* | 7/2019 | Nitanai | G02F 1/133608 |
| 2014/0211123 | A1* | 7/2014 | Lee | G02F 1/133606 349/64 |

* cited by examiner

*Primary Examiner* — Arman B Fallahkhair
(74) *Attorney, Agent, or Firm* — CKC & Partners Co., LLC

(57) ABSTRACT

A display device and its back light module and support column are disclosed. A display device includes a display panel and a back light module. The back light module includes a bottom casing, a plurality of light-emitting components located within the bottom casing and a plurality of support columns located within the bottom casing. Each support column is positioned between adjacent ones of the light-emitting components. Each support column includes a tapered member and a plurality of light-guide members. The tapered member includes at least two opposite surfaces, and the light-guide members are arranged on at least one of the two opposite surfaces, and each light-guide member protrudes from a corresponding one of the two opposite surfaces.

11 Claims, 12 Drawing Sheets

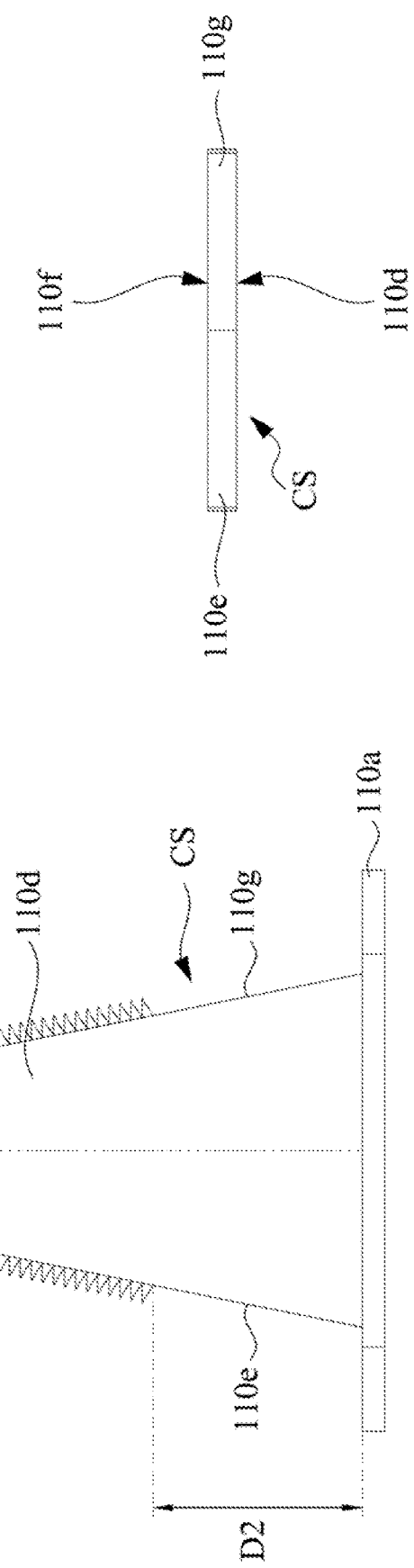
Fig. 9A
Fig. 9B
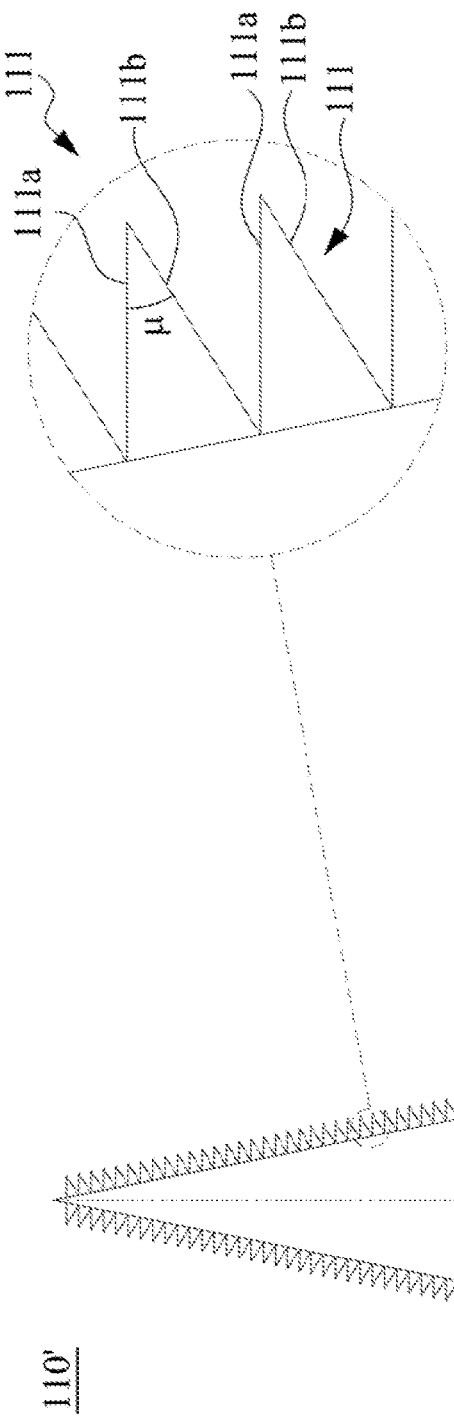
Fig. 8

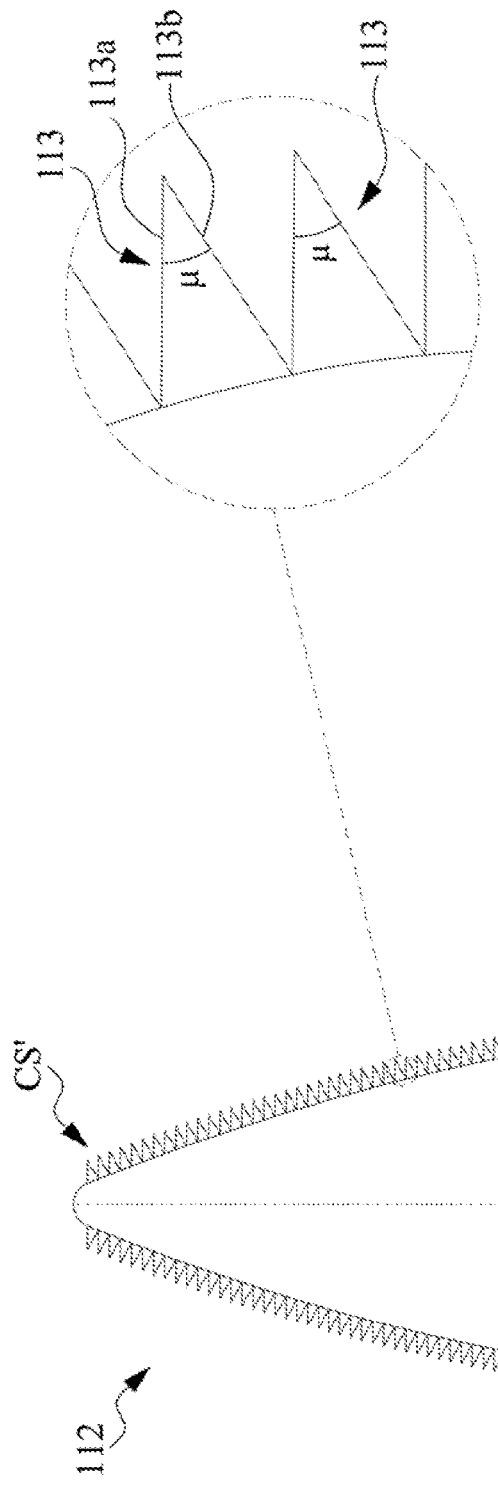
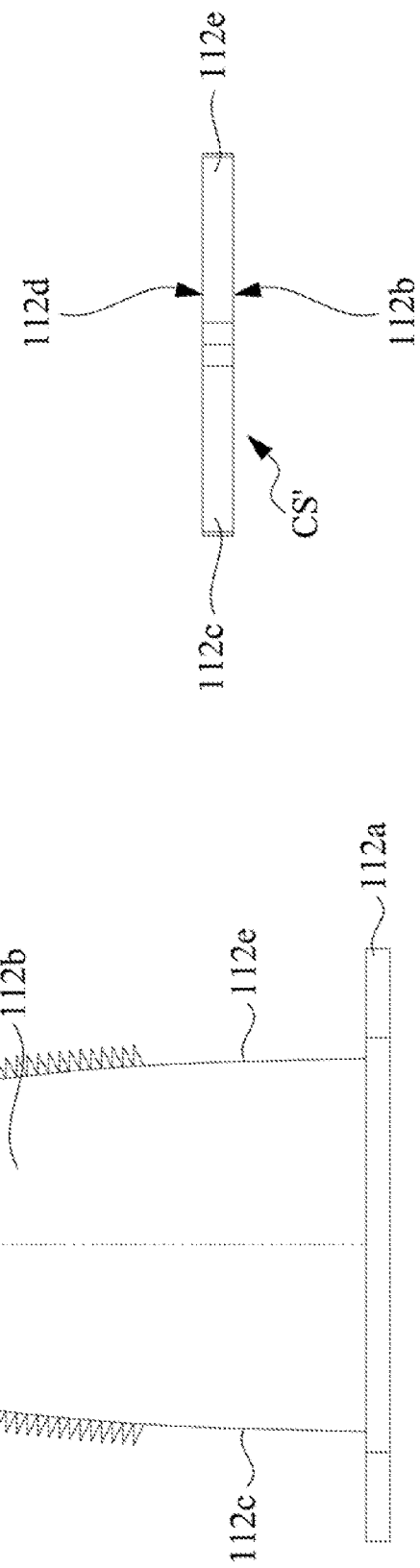

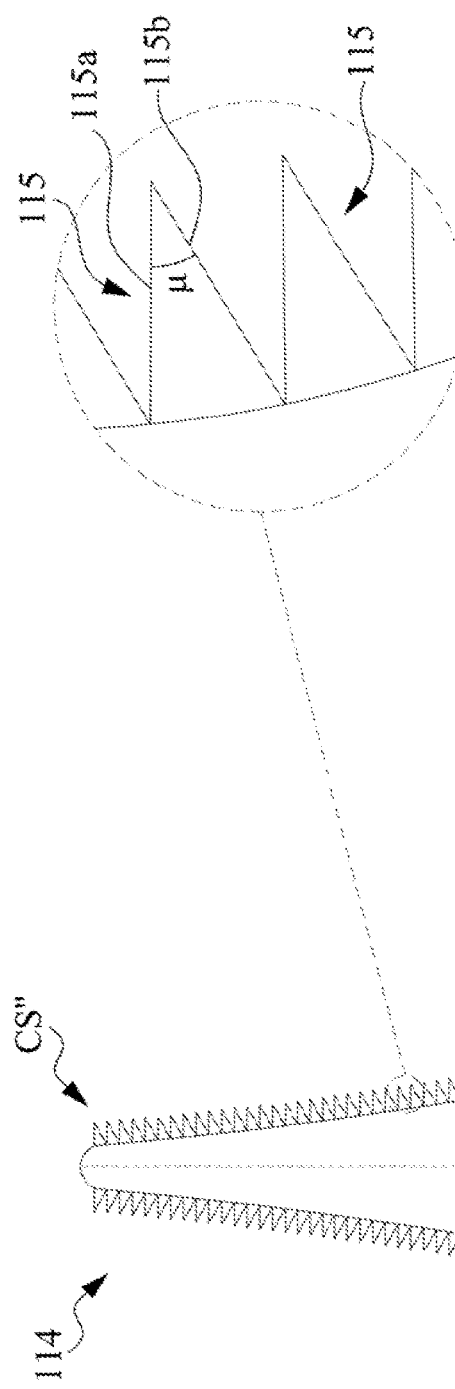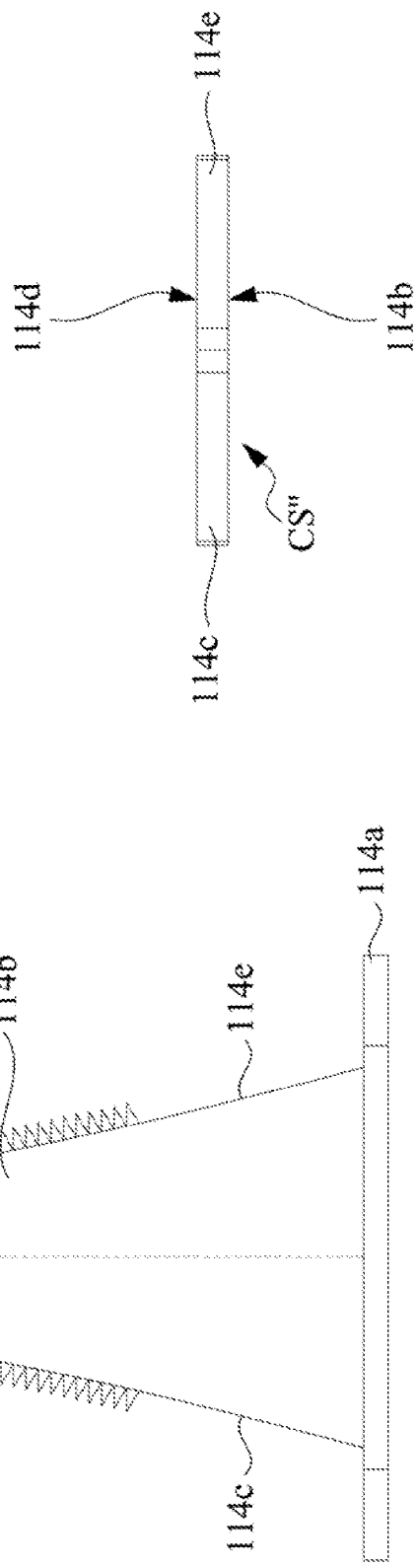
Fig. 14A
Fig. 14B
Fig. 13

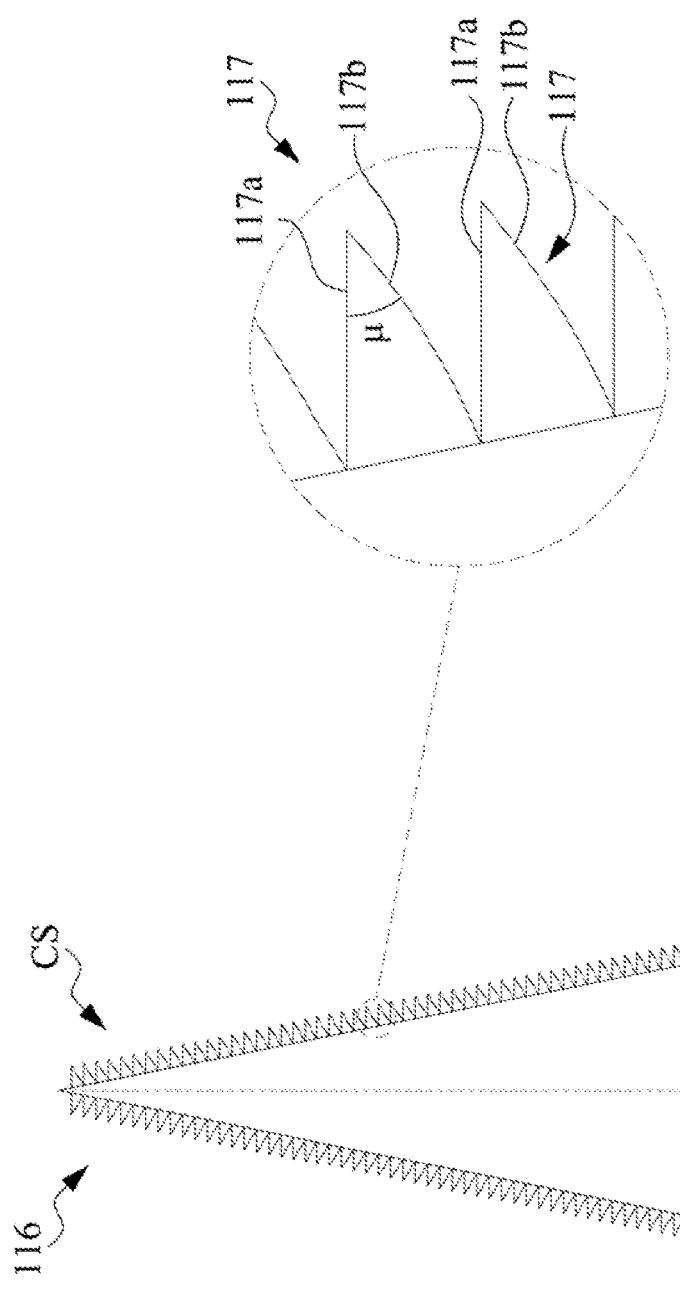
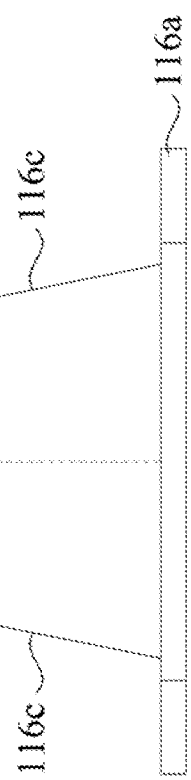

DISPLAY DEVICE AND ITS BACK LIGHT MODULE AND SUPPORT COLUMN

CROSS-REFERENCE TO RELATED APPLICATION

This application claims priority to Taiwan Application Serial Number 112104878, filed Feb. 10, 2023, which is herein incorporated by reference in its entirety.

BACKGROUND

Field of Disclosure

The present disclosure relates to a display device and its back-light module and support column.

Description of Related Art

As the times evolve, people expect a higher image quality and a better picture performance than before for a display device, and the picture defects that were not obvious in the past are also magnified and inspected with the progress of various display devices.

A conventional support column of a direct-lit backlight module for a display panel would cause some black shadows on the screen, which did not have much impact on the screen quality, but affected the user's perception.

SUMMARY

The present disclosure provides a display device and its back-light module and support column to deal with the needs of the prior art problems.

In one or more embodiments, a back light module includes a bottom casing, a plurality of light-emitting components located on an inner wall of the bottom casing and a plurality of support columns located on the inner wall of the bottom casing. Each support column is positioned between adjacent ones of the light-emitting components. Each support column includes a tapered member and a plurality of light-guide members. The tapered member includes at least two opposite surfaces, and the light-guide members are arranged on at least one of the two opposite surfaces, and each light-guide member protrudes from a corresponding one of the two opposite surfaces.

In one or more embodiments, a display device includes a display panel and a back light module arranged as a direct back-lit of the display panel. The back light module includes a bottom casing, a plurality of light-emitting components located within the bottom casing and a plurality of support columns located within the bottom casing. Each support column is positioned between adjacent ones of the light-emitting components. Each support column includes a tapered member and a plurality of light-guide members. The tapered member includes at least two opposite surfaces, and the light-guide members are arranged on at least one of the two opposite surfaces, and each light-guide member protrudes from a corresponding one of the two opposite surfaces.

In one or more embodiments, each support column is located between four adjacent ones of the light-emitting components.

In one or more embodiments, connection lines between four adjacent ones of the light-emitting components define a rectangle, and each support column is located at an intersection of two diagonals of the rectangle.

In one or more embodiments, each support column includes a base portion and the tapered member, and the tapered member protrudes from a top plane of the base portion.

In one or more embodiments, each light-guide member includes an upper plane and a lower plane, and an angle between the upper plane and the lower plane is at least 17 degrees.

In one or more embodiments, each light-guide member includes an upper plane and a lower plane, the upper plane is parallel to the top plane of the base portion.

In one or more embodiments, the tapered member and the light-guide members include the same light-guiding materials.

In one or more embodiments, a support column for a back light module includes a tapered member and a plurality of light-guide members. The tapered member includes at least two opposite surfaces. The light-guide members protrude from at least one of the two opposite surfaces, wherein each light-guide member has an upper surface and a lower surface, and an angle between the upper surface and the lower surface ranges from 17 degrees to 27 degrees.

In one or more embodiments, the tapered member protrudes from a top plane of the base portion, and the upper surface is a plane that is parallel to the top plane of the base portion.

In sum, the back light module with its improved support column disclosed herein can provide a more uniform back-light to a display device as a direct back-lit so as to effectively improve the issue of X-shaped shadows.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 8 illustrates a side view of a support column according to another embodiment of the present disclosure;

FIG. 9A illustrates an enlarged view of the light-guide members in FIG. 8;

FIG. 9B illustrates a top view of the tapered member in FIG. 8;

FIG. 11 illustrates a side view of a support column according to still another embodiment of the present disclosure;

FIG. 12A illustrates an enlarged view of the light-guide members in FIG. 11;

FIG. 12B illustrates a top view of the tapered member in FIG. 11;

FIG. 13 illustrates a side view of a support column according to still another embodiment of the present disclosure;

FIG. 14A illustrates an enlarged view of the light-guide members in FIG. 13;

FIG. 14B illustrates a top view of the tapered member in FIG. 13;

FIG. 15 illustrates a side view of a support column according to still another embodiment of the present disclosure; and FIG. 16 illustrates an enlarged view of the light-guide members in FIG. 15.

DETAILED DESCRIPTION

Figure 1:
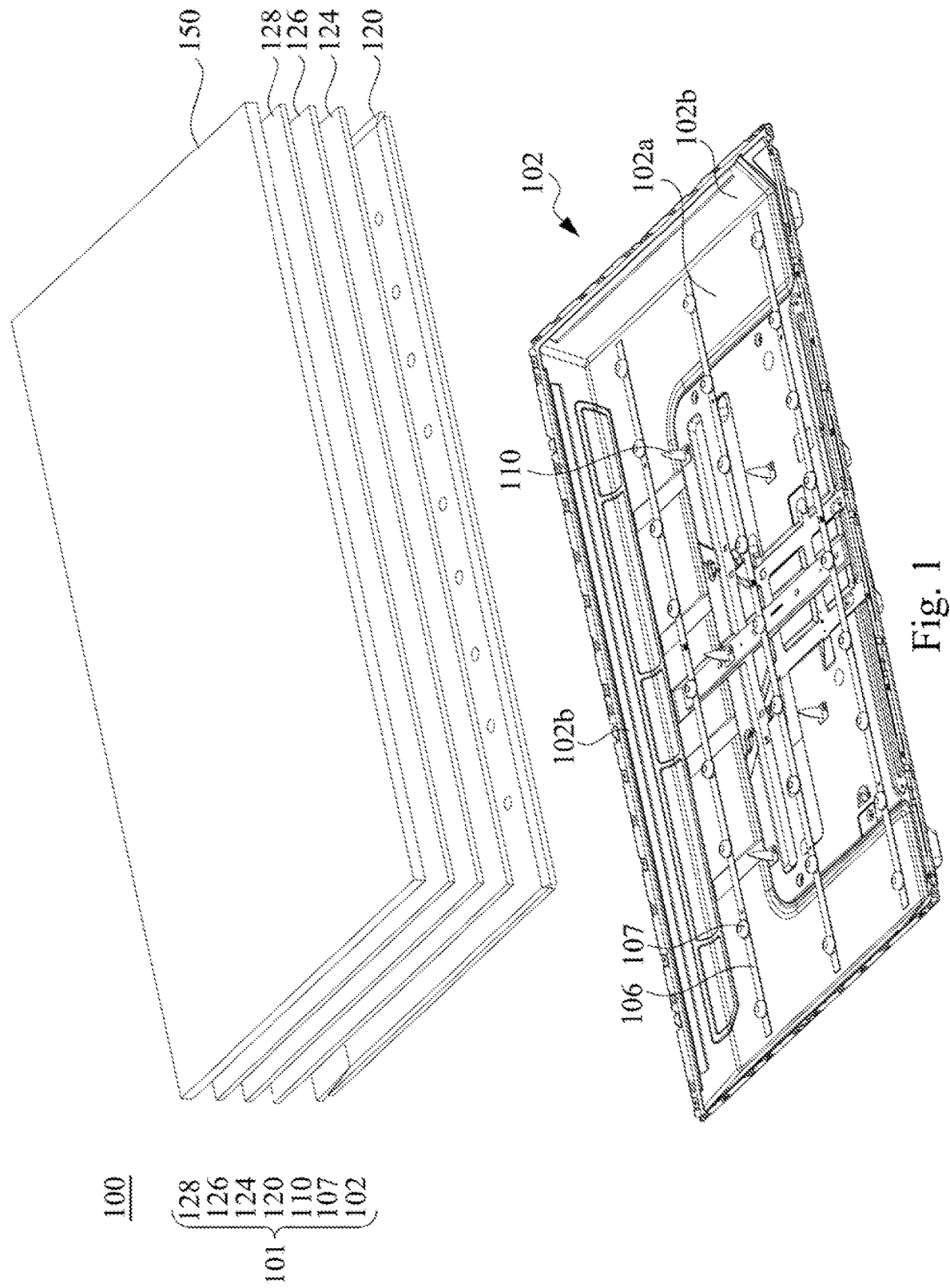
FIG. 1 illustrates an exploded view of a display device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
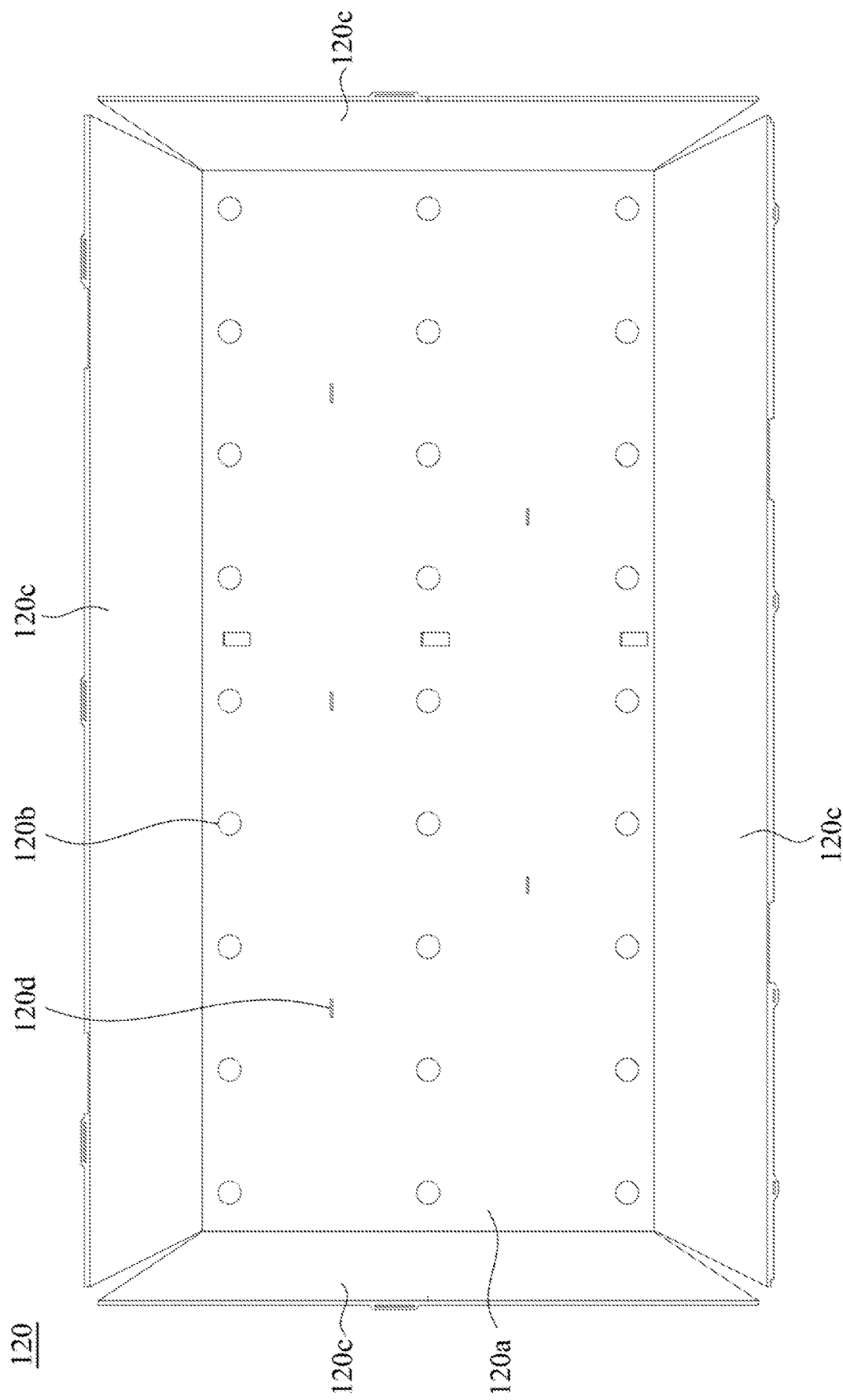
FIG. 2 illustrates a plan view of a light-reflective sheet according to an embodiment of the present disclosure.

Reference is made to FIGS. 1-2, FIG. 1 illustrates an exploded view of a display device 100 according to an embodiment of the present disclosure, and FIG. 2 illustrates a plan view of a light-reflective sheet according to an embodiment of the present disclosure. The display device 100 includes a back light module 101 and a display panel 150. The back light module 101 includes a bottom casing 102, light sources, a plurality of support columns 110, a light-reflective sheet 120, and a plurality of optical sheets (124, 126, 128). The light sources include a plurality of light-emitting components 107 (such as light-emitting diode devices), and the light-emitting components 107 are arranged on a circuit bar 106 and located within the bottom casing 102 to obtain the required power supply and control signals. The support columns 110 are also arranged within the bottom casing 102. An inner wall of the bottom casing 102 includes an inner bottom 102a and four inner side walls 102b. The light-emitting components 107 and the support columns 110 are both located on the inner bottom 102a. The support columns 110 are used to support the optical sheets (124, 126, 128) on their tops.

Referring to FIG. 2, the light-reflective sheet 120 is used to cover the inner wall of the bottom casing 102, a central section 120a of the light-reflective sheet 120 covers the inner bottom 102a of the bottom casing 102, and the four lateral sections 120c of the light-reflective sheet 120 cover the four inner side wall 102b of the bottom casing 102 respectively. The light-reflective sheet 120 is used to reflect the lights output by the light-emitting components 107 to the optical sheets (124, 126, 128), and the lights are then converted into the required backlight for the display panel 150 by the optical sheets (124, 126, 128). A plurality of openings 120b of the light-reflective sheet 120 are used to expose the light-emitting components 107 respectively, and a plurality of openings 120d of the light-reflective sheet 120 are used to expose the support columns 110 respectively.

In some embodiments of the present disclosure, the optical sheet 124 can be a diffusion sheet, and the optical sheet 126 can be a prism sheet. Furthermore, the optical sheet 128 can be another prism sheet, but not being limited thereto.

Figure 3:
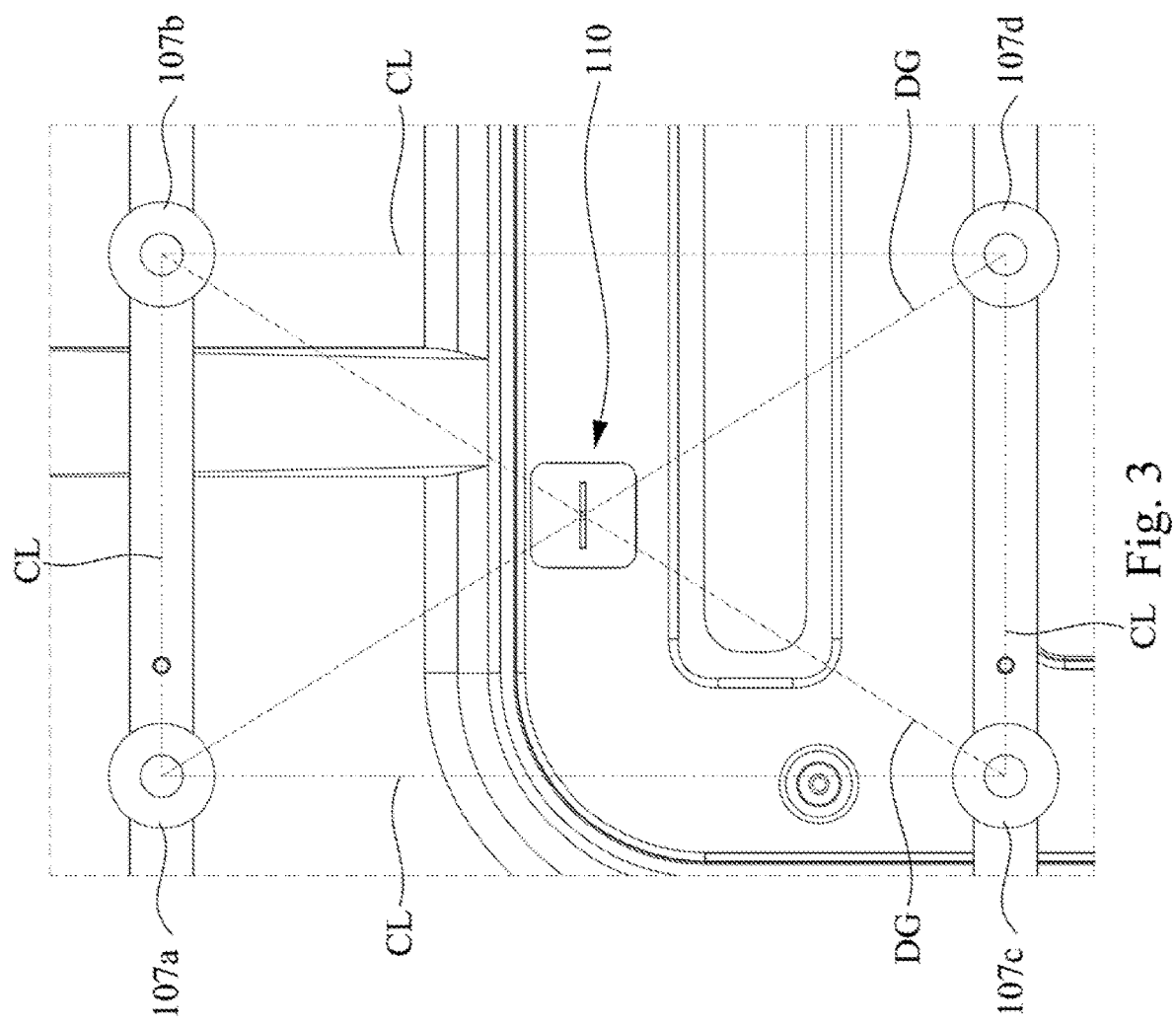
FIG. 3 illustrates a top view of a support column and its surrounding light-emitting components in a display device according to an embodiment of the present disclosure.
Figure 4:
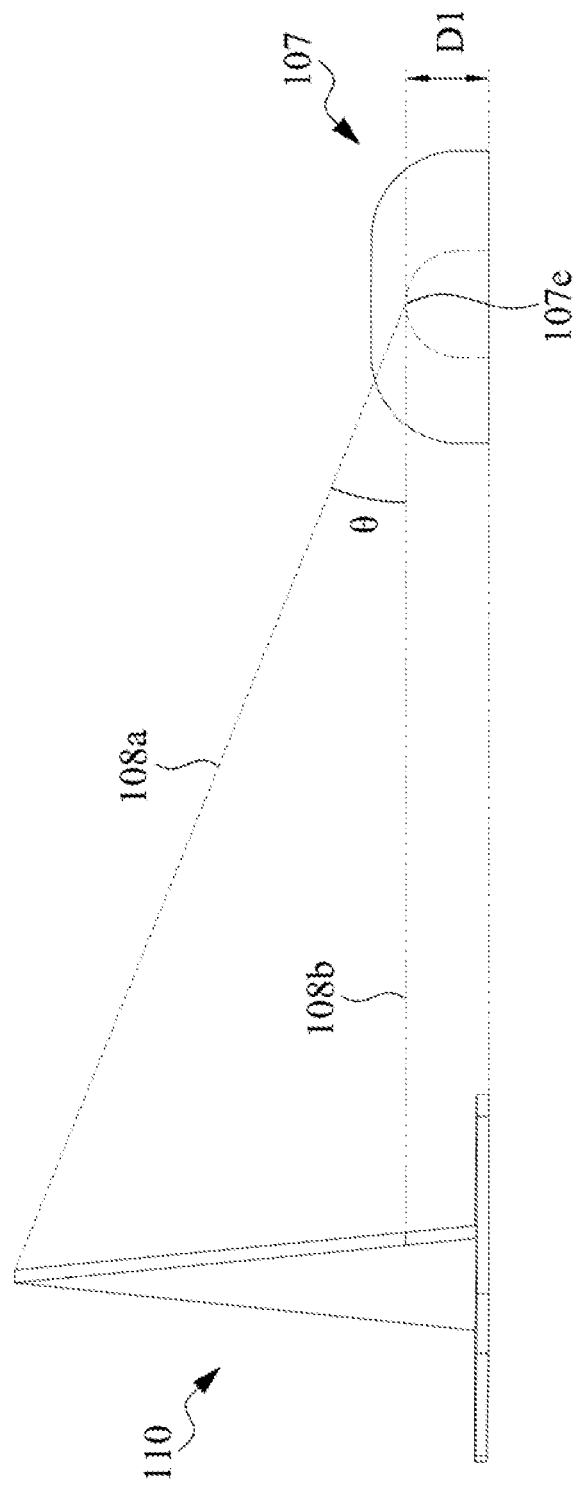
FIG. 4 illustrates a side view of a support column and its adjacent light-emitting component in a display device according to an embodiment of the present disclosure.

Reference is made to FIGS. 3-4, FIG. 3 illustrates a top view of a support column and its surrounding light-emitting components in a display device according to an embodiment of the present disclosure, and FIG. 4 illustrates a side view of a support column and its adjacent light-emitting component in a display device according to an embodiment of the present disclosure. FIG. 3 shows one of the support columns 110 and its surrounding and immediately-adjacent four light-emitting components (107a, 107b, 107c, 107d) in FIG. 2. In some embodiments of the present disclosure, the lines CL connecting four adjacent light-emitting components (107a, 107b, 107c, 107d) define a rectangle, and the support column 110 is located at an intersection of the two diagonals DG of the rectangle. After observing a screen of the display device, it is easy to generate an X-shaped shadow in a screen area corresponding to the four light-emitting components (107a, 107b, 107c, 107d). After observing the side view of the support column 110 and its adjacent light-emitting component 107, an angle θ, between a horizontal line 108b and the line 108a connecting a luminescent center 107e and a top of the support column 110, ranges from about 3° (degrees) to about 13° (degrees).

Figure 5:
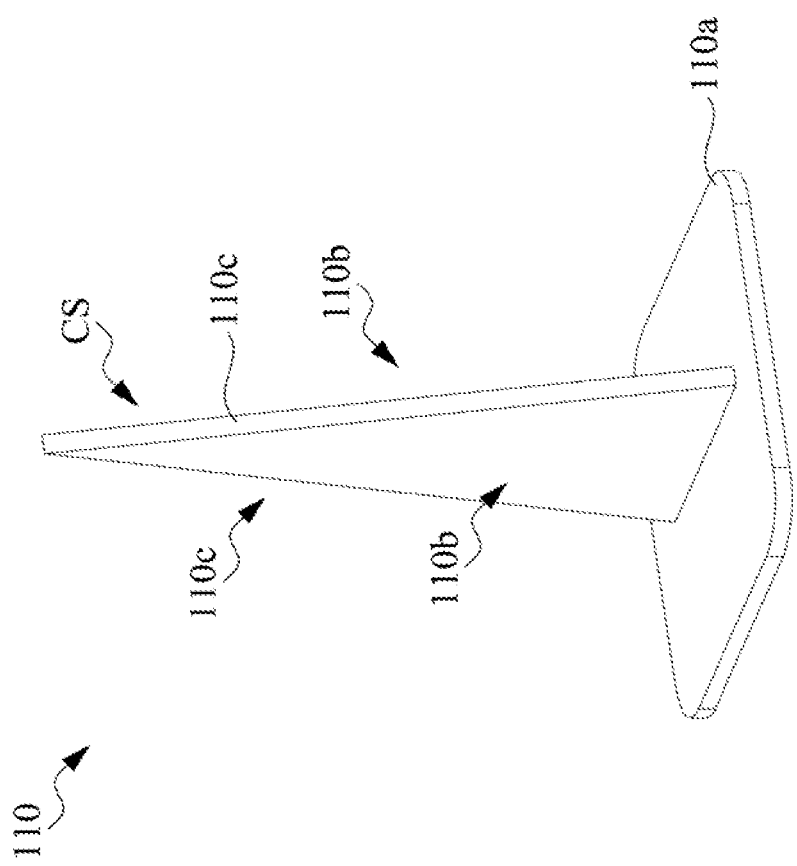
FIG. 5 illustrates a perspective view of a support column according to an embodiment of the present disclosure.
Figure 6:
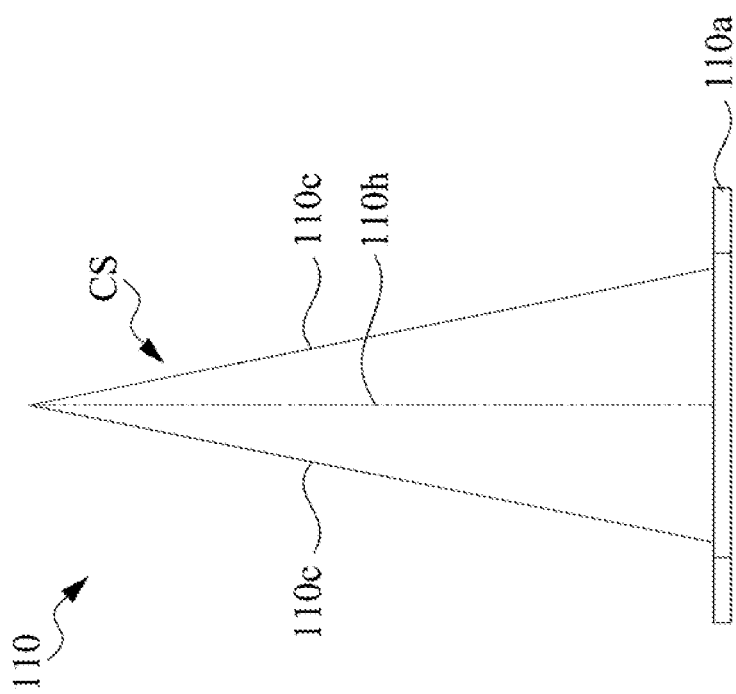
FIG. 6 illustrates a side view of a support column according to an embodiment of the present disclosure.
Figure 7:
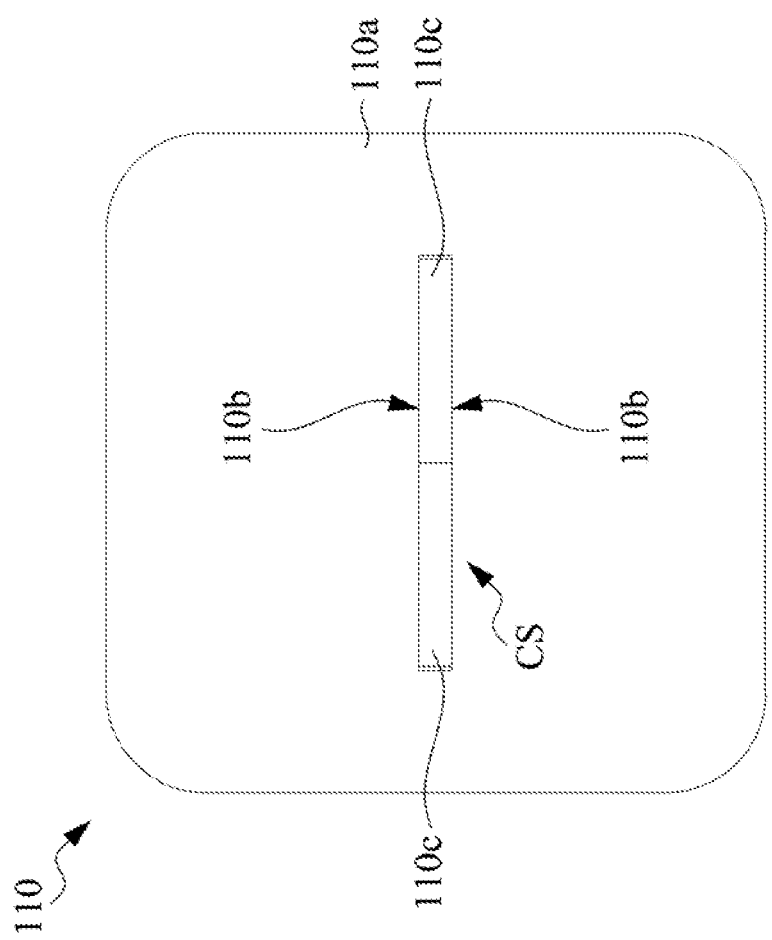
FIG. 7 illustrates a top view of a support column according to an embodiment of the present disclosure.

Reference is made to FIGS. 5-7, FIG. 5 illustrates a perspective view of a support column according to an embodiment of the present disclosure, FIG. 6 illustrates a side view of a support column according to an embodiment of the present disclosure, and FIG. 7 illustrates a top view of a support column according to an embodiment of the present disclosure. In some embodiments of the present disclosure, the support column 110 is a light-guide member with a light transmittance from about 40% to about 60%. The support column 110 includes a base portion 110a and a tapered member CS, and the tapered member CS protrudes from a top plane of the base portion 110a. The tapered member CS includes two symmetrical and parallel surfaces 110b and two symmetrical but non-parallel surfaces 110c. In other words, the tapered member CS includes two groups of opposite surfaces (110b, 110c). The two opposite surfaces 110b are flat surfaces and parallel to each other such that the tapered member CS can be a tapered member with an equal thickness. The two opposite surfaces 110c are symmetrical to each other relative to a central normal line 110h. The central normal line 110h passes through a top (an intersection of the surfaces 110c) of the tapered member CS and is perpendicular to the top plane of the base portion 110a. The research of this case has confirmed that part of the light beams emitted by the light-emitting components will be reflected back because the diffusion sheet is not permeable to all light beams (i.e., the transmittance is between 40 and 60%), and the light-reflective sheet is used to improve light utilization. However, the light reflection path produces the aforementioned X-shaped shadow due to a block of the support column structure.

Reference is made to FIGS. 8, 9A and 9B, FIG. 8 illustrates a side view of a support column according to another embodiment of the present disclosure, FIG. 9A illustrates an enlarged view of the light-guide members in FIG. 8, and FIG. 9B illustrates a top view of the tapered member in FIG. 8 without illustrating the light-guide members 111. In this embodiment, the tapered member CS includes surfaces 110d, 110e, 110f, and 110g, but the disclosure is not limited thereto. In order to solve the aforementioned X-shaped shadow issue, the support column 110' adds a plurality of light-guide members 111 on the two surfaces 110e and 110g of its tapered member CS. In other embodiments, the light-guide members 111 may be only located on the surfaces 110e and 110g. In some other embodiments, the light-guide members 111 can be located on any of the surfaces 110d, 110e, 110f, and 110g. In addition, the surface 110d and the surface 110f are opposite to each other, while the surface 110e and the surface 110g are opposite to each other, and are sandwiched by the surfaces 110d and 110f respectively, and the surfaces 110e and 110g have their top ends are connected to each other. The light-guide members 111 are arranged on at least one of the surfaces 110d, 110e, 110f, 110g. In this embodiment, the light-guide members 111 are located on the surfaces 110e and 110g. Each light-guide member 111 has an upper plane 111a and a lower plane 111b. In this embodiment, the projections of the upper plane 111a, the lower plane 111b and the tapered member CS on a side plane are roughly triangular in shape, but the disclosure is not limited thereto. The side plane is approximately perpendicular to the top plane of the base portion 110a. In this embodiment, an angle µ between the upper plane 111a and the lower plane 111b is at least 17 degrees, and a preferred range of the angle µ ranges from about 17 degrees to about 27 degrees, but the disclosure is not limited thereto. In some embodiments of the present disclosure, the light-guide members 111 may fully cover the two surfaces 110e and 110g, or only cover a portion of the two surfaces 110e and 110g (such as the portion illustrated in FIG. 8). In some embodiments of the present disclosure, a height D2 of the surfaces 110e and 110g without the light-guide members or the light-guide members covering a portion thereof is approximately equal to the height D1 illustrated in FIG. 4. In some embodiments of the present disclosure, the upper plane 111a of each light-guide member 111 is parallel to the top plane of the base portion 110a, that is, the upper planes 111a of the light-guide members 111 are all parallel to one another and parallel to the top plane of base portion 110a. In some embodiments of the present disclosure, the light-guide members 111 located on the surfaces 110e and 110g are continuous, that is, the lower plane 111b of a light-guide member 111 is connected to the upper plane 111a of another light-guide member 111 immediately below (referring to FIG. 9A). In some embodiments of the present disclosure, the light-guide members 111 located on the surfaces 110e and 110g are discontinuous, that is, the lower and upper planes of two adjacent light-guide members 111 are not connected. In some embodiments of the present disclosure, the base portion 110a, the tapered member CS and the light-guide member 111 of the support column 110' are all made of the same light-guiding materials. In some embodiments of the present disclosure, the tapered member CS and light-guide member 111 of the support column 110' can be made of different light-guiding materials.

Figure 10:
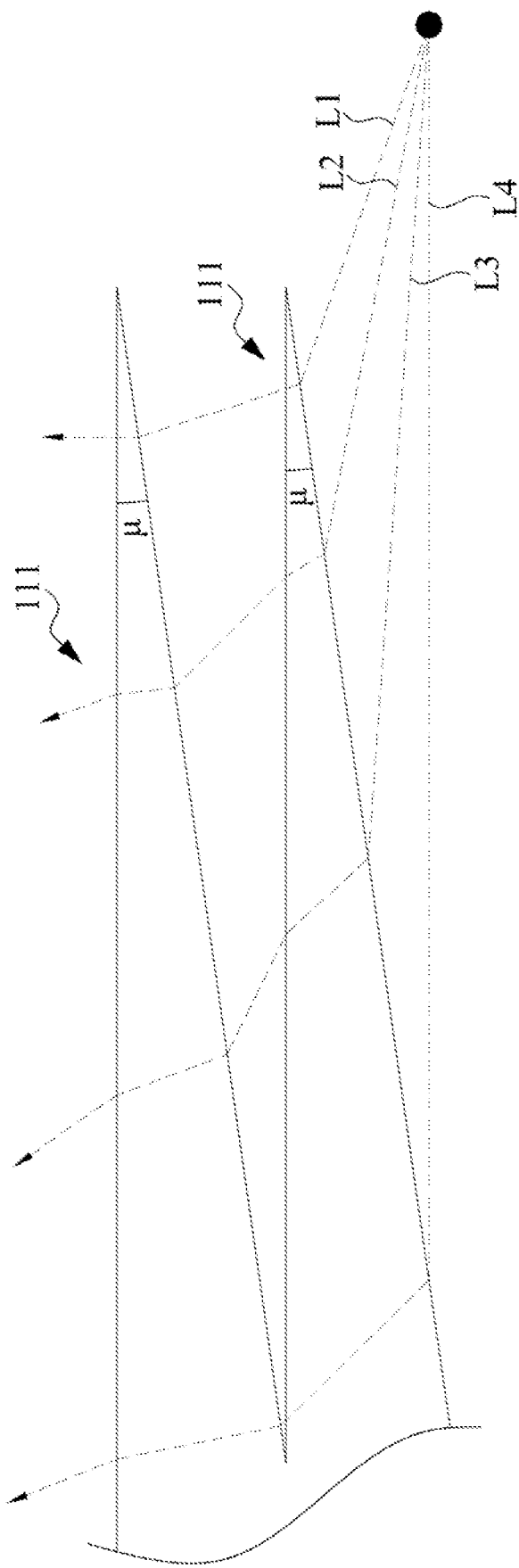
FIG. 10 illustrates how the light-guide members direct light beams according to an embodiment of the present disclosure.

Reference is made to FIG. 10, which illustrates how the light-guide members direct light beams according to an embodiment of the present disclosure. When the surface 110c of the light-guide member is provided with the light-guide members 111, an incident light beam will be guided vertically upward, or perpendicular to the top plane of the base portion 110a in FIG. 8 by more than two light-guide members 111. For example, after being guided by two consecutive light-guide members 111 in the figure, the light beam L1 leaves the tapered member vertically upwards. The light beam L2, the light beam L3 and the light beam L4 are guided by two consecutive light-guide members 111 in the figure, and are still guided by more light-guide members 111 before they are directed vertically upwards. After the support column 110' is equipped with the light-guide members 111 on its two surfaces 110c, it can form a more uniform backlight than the support column 110 in the surrounding area of the support column, thereby reducing or eliminating the aforementioned X-shaped shadow issue. The angle µ, between the upper plane 111a and the lower plane 111b, is at least 17 degrees, and a preferred range of the angle µ ranges from 17 degrees to 27 degrees.

Reference is made to FIGS. 11, 12A and 12B, FIG. 11 illustrates a side view of a support column according to still another embodiment of the present disclosure, FIG. 12A illustrates an enlarged view of the light-guide members in FIG. 11, and FIG. 12B illustrates a top view of the tapered member in FIG. 11 without illustrating the light-guide members 113. The support column 112 includes a base portion 112a and a tapered member CS', and the tapered member CS' protrudes from a top plane of the base portion 112a. In this embodiment, the tapered member CS' includes surfaces 112b, 112c, 112d, and 112e, but the disclosure is not limited thereto. Different from the tapered member CS, the two surfaces 112c and 112e of the tapered member CS' are arc-shaped surfaces, rather than flat surfaces as the surfaces 110e and 110g. In order to solve the aforementioned X-shaped shadow issue, the support column 112 is equipped with a plurality of light-guide members 113 on the two surfaces 112c and 112e of its tapered member CS'. In other embodiments, the light-guide members 113 can be only located on the surfaces 112c and 112e. In some other embodiments, the light-guide members 113 can be located on any of the surfaces 112b, 112c, 112d, and 112e. Each light-guide member 113 has an upper plane 113a and a lower plane 113b. An angle µ, between the upper plane 113a and the lower plane 113b, is at least 17° (degrees), and the preferred range of the angle µ is 17° to 27°. In this embodiment, the shape enclosed by the upper plane 113a, the lower plane 113b and the tapered member CS' on the side plane is roughly triangular, but the present disclosure is not limited thereto. The side plane is substantially perpendicular to the top plane of the base portion 112a. In some embodiments of the present disclosure, the light-guide members 113 can fully cover the two surfaces 112c and 112e, or only cover portions of the two surfaces 112c and 112e as illustrated in FIG. 11. In some embodiments of the present disclosure, the upper plane 113a of each light-guide member 113 is parallel to the top plane of the base portion 112a, that is, the upper planes 113a of the light-guide members 113 are all parallel to one another and parallel to the top plane of the base portion 112a. In some embodiments of the present disclosure, the light-guide members 113 located on the surfaces 112c and 112e are continuous, that is, the lower plane 113b of a light-guide member 113 is connected to the upper plane 113a of another light-guide member 113 immediately below (referring to FIG. 12A). In some embodiments of the present disclosure, the light-guide members 113 located on the surfaces 112c and 112e are discontinuous, that is, the lower plane and the upper plane of two adjacent light-guide members 113 are not connected. In some embodiments of the present disclosure, the base portion 112a, the tapered member CS' and the light-guide members 113 of the support column 112 are all made of the same light-guiding materials. In some embodiments of the present disclosure, the tapered member CS' and the light-guide members 113 of the support column 112 can be made of different light-guiding materials.

Reference is made to FIGS. 13, 14A and 14B, FIG. 13 illustrates a side view of a support column according to still another embodiment of the present disclosure, FIG. 14A illustrates an enlarged view of the light-guide members in FIG. 13, and FIG. 14B illustrates a top view of the tapered member in FIG. 13 without illustrating the light-guide members 115. The support column 114 includes a base portion 114a and a tapered member CS", and the tapered member CS" protrudes from a top plane of the base portion 114a. In this embodiment, the tapered member CS" includes surfaces 114b, 114c, 114d, and 114e, but the present disclosure is not limited thereto. Different from the tapered member CS', the two surfaces 114c and 114e of the tapered member CS" are concave arcuate surfaces, rather than convex arcuate surfaces as the surfaces 112c, 112e. In order to solve the aforementioned X-shaped shadow issue, the support column 114 is equipped with a plurality of light-guide members 115 on the two surfaces 114c and 114e of its tapered member CS". In other embodiments, the light-guide member 115 can be located only on the surfaces 114c and 114e. In some other embodiments, the light-guide member 115 can be located on any of the surfaces 114b, 114c, 114d and 114e. Each light-guide member 115 has an upper plane 115a and a lower plane 115b, an angle μ between the upper plane 115a and the lower plane 115b is at least 17 degrees, and the preferred range of the included angle μ is from 17 degrees to 27 degrees. In this embodiment, the upper plane 115a, the lower plane 115b and the tapered member CS" are on the side The enclosed shape on the plane is roughly triangular, but the present disclosure is not limited thereto. The side plane is substantially perpendicular to the top plane of the base portion 114a. In some embodiments of the present disclosure, the light-guide member 115 can fully cover the two surfaces 114c and 114e, or only cover portions of the two surfaces 114c and 114e as illustrated in FIG. 13. In some embodiments of the present disclosure, the upper plane 115a of each light-guide member 115 is parallel to the top plane of the base portion 114a, that is, the upper planes 115a of the light-guide members 115 are all parallel to one another and parallel to the top plane of the base portion 114a. In some embodiments of the present disclosure, the light-guide members 115 located on the surfaces 114c and 114e are continuous, that is, the lower plane 115b of a light-guide member 115 is connected to the upper plane 115a of another light-guide member 115 immediately below (referring to FIG. 14A). In some embodiments of the present disclosure, the light-guide members 115 located on the surfaces 114c and 114e are discontinuous, that is, the lower plane and the upper plane of two adjacent light-guide members 115 are not connected. In some embodiments of the present disclosure, the base portion 114a, the tapered member CS" and the light-guide member 115 of the support column 114 are all made of the same light-guiding materials. In some embodiments of the present disclosure, the tapered member CS" and light-guide member 115 of the support column 114 can be made of different light-guiding materials.

Reference is made to FIGS. 15 and 16, FIG. 15 illustrates a side view of a support column according to still another embodiment of the present disclosure, and FIG. 16 illustrates an enlarged view of the light-guide members in FIG. 15. The support column 116 includes a base portion 116a and a tapered member CS, and the structure of the tapered member CS is substantially the same as the one in FIG. 8 and equipped with a plurality of light-guide members 117. Similarly, each light-guide member 117 also has an upper surface 117a and a lower surface 117b. The difference is that in this embodiment, the lower surface 117b is a curved surface instead of a plane or a flat surface, and the upper surface 117a is still a plane or flat surface. Therefore, a projected shape of the upper surface 117a, the lower surface 117b and the tapered member CS on a side plane is not necessarily a triangular shape. The side plane is substantially perpendicular to the top plane of the base portion 116a. In some embodiments of the present disclosure, the light-guide members 117 can fully cover the two surfaces 116c, or only cover portions of the two surfaces 116c as illustrated in FIG. 15. In some embodiments of the present disclosure, the upper surface 117a of each light-guide member 117 is parallel to the top plane of the base portion 116a, that is, the upper surfaces 117a of the light-guide members 117 are all parallel to one another and parallel to the top plane of the base portion 116a. In some embodiments of the present disclosure, the light-guide members 117 located on the surfaces 116c are continuous, that is, the lower surface 117b of a light-guide member 117 is connected to the upper surface 117a of another light-guide member 117 immediately below (referring to FIG. 16). In some embodiments of the present disclosure, the light-guide members 117 located on the surfaces 116c are discontinuous, that is, the lower and the upper surfaces of two adjacent light-guide members 117 are not connected. In some embodiments of the present disclosure, the base portion 116a, the tapered member CS and the light-guide members 117 of the support column 116 are all made of the same light-guide materials. In some embodiments of the present disclosure, the tapered member CS and the light-guide members 117 of the support column 116 can be made of different light-guiding materials. In other embodiments, the light-guide members 117 can also be designed on the surfaces of the above-mentioned tapered member CS' or tapered member CS".

In sum, the back light module with its improved support column disclosed herein can provide a more uniform backlight to a display device as a direct back-lit so as to effectively improve the issue of X-shaped shadows.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A back light module comprising:
    a bottom casing;
    a plurality of light-emitting components disposed within the bottom casing; and
    a plurality of support columns disposed within the bottom casing, wherein each support column is disposed between adjacent ones of the light-emitting components,
    wherein each support column comprises a tapered member, a base portion and a plurality of semi-translucent light-guide members, the tapered member protrudes from a top plane of the base portion, the tapered member comprises two non-parallel opposite surfaces and two opposite parallel surfaces, and the light-guide members protrude only from the two non-parallel opposite surfaces and extend only from a top portion of the tapered member, and each light-guide member comprises an upper plane and a lower plane, the upper plane is parallel to the top plane of the base portion.

2. The back light module of claim 1, wherein each support column is located between four adjacent ones of the light-emitting components.

3. The back light module of claim 2, wherein connection lines between four adjacent ones of the light-emitting components define a rectangle, and each support column is located at an intersection of two diagonals of the rectangle.

4. The back light module of claim 1, wherein each an angle between the upper plane and the lower plane is at least 17 degrees.

5. The back light module of claim 1, wherein the tapered member and the light-guide members comprise the same light-guiding materials.

6. A display device comprising:
a display panel; and
a back light module arranged as a direct back-lit of the display panel, wherein the back light module comprises:
a bottom casing;
a plurality of light-emitting components disposed within the bottom casing; and
a plurality of support columns disposed within the bottom casing, wherein each support column is disposed between adjacent ones of the light-emitting components,
wherein each support column comprises a tapered member, a base portion and a plurality of semi-translucent light-guide members, the tapered member protrudes from a top plane of the base portion, the tapered member comprises two non-parallel opposite surfaces and two opposite parallel surfaces, and the light-guide members protrude only from the two non-parallel opposite surfaces and extend only from a top portion of the tapered member, and each light-guide member comprises an upper plane and a lower plane, the upper plane is parallel to the top plane of the base portion.

7. The display device of claim 6, wherein each support column is located between four adjacent ones of the light-emitting components.

8. The display device of claim 7, wherein connection lines between four adjacent ones of the light-emitting components define a rectangle, and each support column is located at an intersection of two diagonals of the rectangle.

9. The display device of claim 6, wherein an angle between the upper plane and the lower plane is at least 17 degrees.

10. The display device of claim 6, wherein the tapered member and the light-guide members comprise the same light-guiding materials.

11. A support column applied in a back light module comprising:
a tapered member protruding from a top plane of a base portion and comprising two non-parallel opposite surfaces and two opposite parallel surfaces; and
a plurality of semi-translucent light-guide members protruding only from the two non-parallel opposite surfaces and extended only from a top portion of the tapered member, wherein each light-guide member has an upper surface and a lower surface, the upper surface is a plane that is parallel to the top plane of the base portion, and an angle between the upper surface and the lower surface ranges from 17 degrees to 27 degrees.

* * * * *